(12) United States Patent
Mizuno et al.

(10) Patent No.: US 8,301,321 B2
(45) Date of Patent: Oct. 30, 2012

(54) CONTROL APPARATUS

(75) Inventors: Akira Mizuno, Tokyo (JP); Masao Ando, Tokyo (JP); Munehisa Horiguchi, Tokyo (JP); Takashi Naito, Tokyo (JP)

(73) Assignee: Equos Research Co., Ltd. (JP)

( * ) Notice: Subject to any disclaimer, the term of this patent is extended or adjusted under 35 U.S.C. 154(b) by 313 days.

(21) Appl. No.: 12/671,070

(22) PCT Filed: Jul. 1, 2008

(86) PCT No.: PCT/JP2008/061929
§ 371 (c)(1),
(2), (4) Date: Jan. 28, 2010

(87) PCT Pub. No.: WO2009/016907
PCT Pub. Date: Feb. 5, 2009

(65) Prior Publication Data
US 2010/0198441 A1 Aug. 5, 2010

(30) Foreign Application Priority Data
Jul. 31, 2007 (JP) .................. 2007-200010

(51) Int. Cl.
*B60W 10/30* (2006.01)
*B60W 10/20* (2006.01)

(52) U.S. Cl. ............... 701/22; 701/36; 701/80

(58) Field of Classification Search .......... 701/79, 701/80, 22, 36, 41; 33/203, 203.12, 264
See application file for complete search history.

(56) References Cited

U.S. PATENT DOCUMENTS

| | | | |
|---|---|---|---|
| 3,342,086 A | 9/1967 | Borman et al. | |
| 4,752,079 A | 6/1988 | Fahrner | 280/112 |
| 4,840,393 A | 6/1989 | Mueller et al. | 280/661 |
| 6,256,894 B1 * | 7/2001 | Naruse et al. | 33/203.12 |
| 6,374,159 B1 * | 4/2002 | Naruse et al. | 700/279 |
| 6,386,553 B2 * | 5/2002 | Zetterstrom | 280/5.51 |
| 6,453,567 B1 * | 9/2002 | Naruse | 33/203 |
| 6,564,461 B1 * | 5/2003 | Naruse | 33/203 |
| 6,650,980 B2 * | 11/2003 | Ashrafi | 701/41 |
| 6,882,917 B2 * | 4/2005 | Pillar et al. | 701/48 |
| 7,398,984 B2 * | 7/2008 | Tucker | 280/124.116 |
| 7,877,884 B2 * | 2/2011 | Harrill et al. | 33/264 |
| 7,991,532 B2 * | 8/2011 | Miki et al. | 701/80 |
| 8,055,423 B2 * | 11/2011 | Hattori et al. | 701/79 |
| 2005/0012501 A1 * | 1/2005 | Isono et al. | 324/300 |
| 2008/0162009 A1 * | 7/2008 | Miki et al. | 701/80 |
| 2010/0198441 A1 * | 8/2010 | Mizuno et al. | 701/22 |

FOREIGN PATENT DOCUMENTS

| | | |
|---|---|---|
| JP | 62-152804 | 9/1987 |
| JP | 04-46966 | 11/1992 |
| JP | 05-077626 | 3/1993 |
| JP | 06-011420 | 1/1994 |
| JP | 3014438 | 2/2000 |

* cited by examiner

*Primary Examiner* — Thomas Black
*Assistant Examiner* — Wae Louie
(74) *Attorney, Agent, or Firm* — Bacon & Thomas, PLLC

(57) ABSTRACT

A control device corrects the alignment of wheels of a vehicle during travel to improve fuel consumption performance. Operating conditions of a suspension device (alignment adjustment device) are controlled by alignment control while the vehicle is traveling, and when the alignment of the wheels is adjusted, travel resistance of the vehicle increases or decreases. The control device detects the travel resistance of the vehicle based on the value of an electric current supplied to a wheel drive device (electric motor), and the alignment of the wheels is adjusted so that the travel resistance of the vehicle decreases. As a result, the alignment of the wheels during travel is adjusted to a correct state to improve fuel consumption performance.

14 Claims, 9 Drawing Sheets

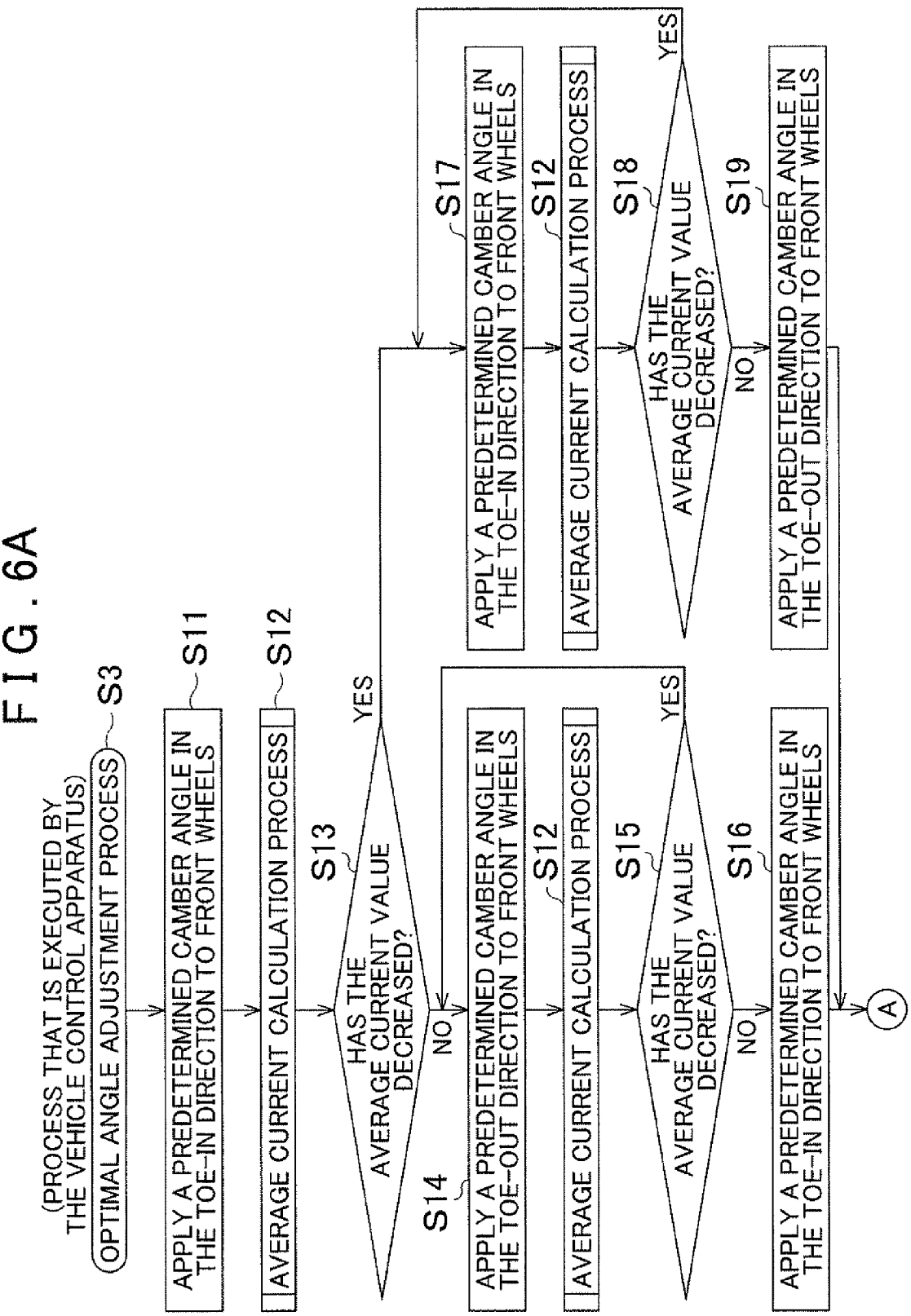

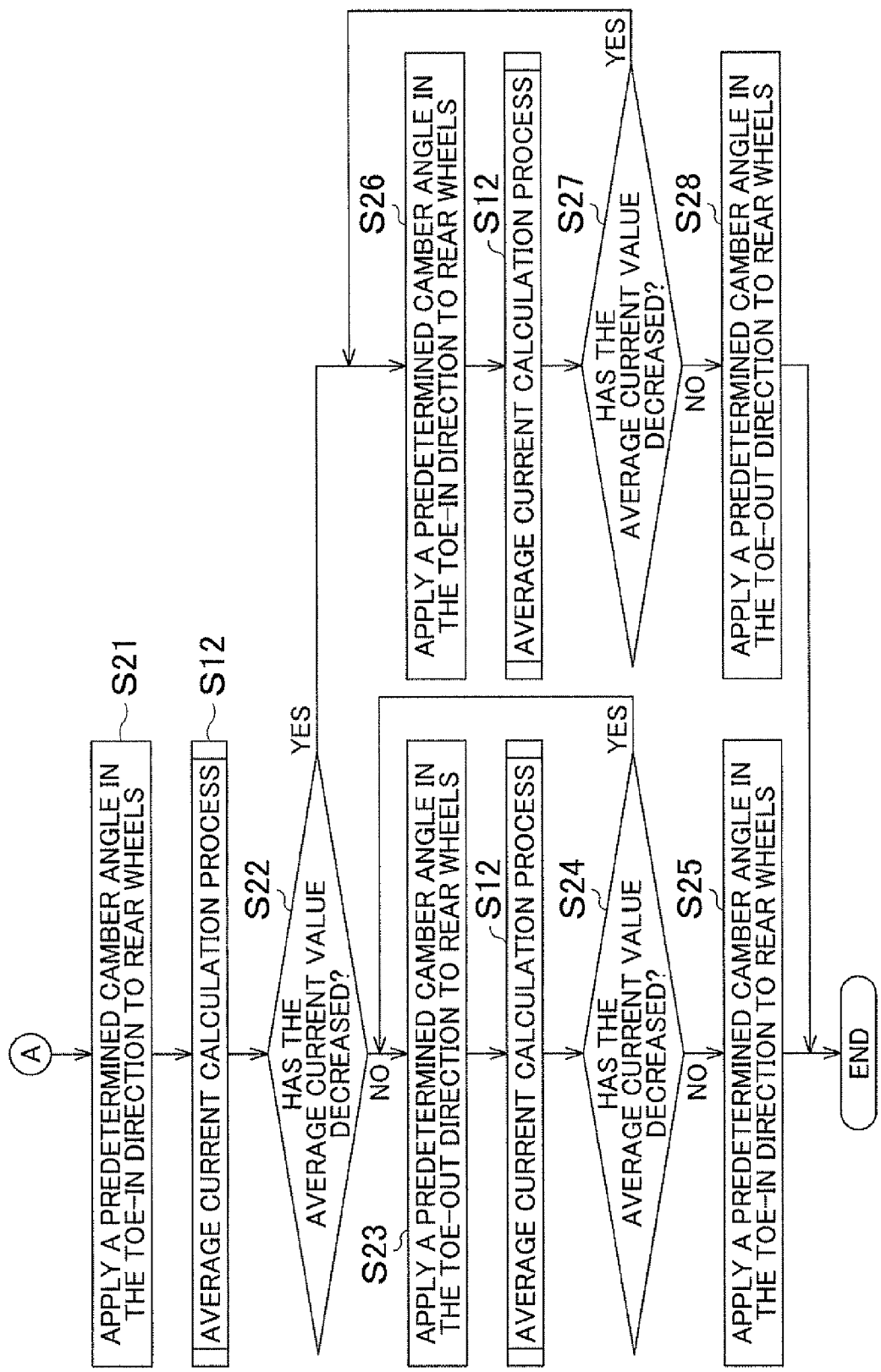

CONTROL APPARATUS

TECHNICAL FIELD

The present invention relates to a control apparatus for use in a vehicle that includes a wheel and an alignment adjustment apparatus for adjusting the alignment of the wheel. More particularly, the present invention relates to a control apparatus capable of achieving proper alignment of the wheels of a vehicle when the vehicle is traveling, thereby improving fuel consumption performance.

BACKGROUND ART

The "alignment" refers to the alignment of wheels, that is, the angle of the wheels with respect to the traveling direction of a vehicle or the road surface. The alignment is mainly represented by a camber angle and a toe angle. Misalignment is caused by displacement of a suspension apparatus due to an impact that is applied when a vehicle is traveling, deterioration of tires due to aging, and the like, and affects traveling stability of the vehicle, uneven wear of the tires, and the like. Thus, the alignment is measured and adjusted by various apparatuses.

The alignment is typically measured and adjusted by measuring the angle and dimensions of each wheel, and adjusting the toe angle and the camber angle respectively to target values that are determined when designing vehicles.

For example, Patent Document 1 describes a technique for improving measurement accuracy of the alignment. In this technique, a pair of non-contact distance measuring sensors are provided so as to face a side surface of a tire to be measured. With the distance measuring sensors being kept in a stationary state, the tire is rotated by 360 degrees to continuously measure the distance to the side surface of the tire. Then, with the tire being kept in a stationary state, the distance measuring sensors are rotated by 360 degrees to continuously measure the distance to the side surface of the tire. A predetermined calculation is performed based on the distance data obtained by rotating the tire, and the distance data obtained by rotating the distance measuring sensors, whereby measurement accuracy of the alignment is improved.

However, this technique has the following problem. This technique is intended only to measure and adjust the alignment when the vehicle is stopped, and is not intended to measure the alignment when the vehicle is traveling. Thus, it is difficult to keep track of an actual traveling state of the vehicle, and adjustment cannot be made accurately.

That is, tires during traveling of the vehicle have characteristics such as deformation of the tire caused by a lateral force that is generated due to a slip angle, camber thrust that is generated due to the camber angle, and the relation between these forces and the rigidity of the tire, and non-uniformity due to a manufacturing error. Thus, in order to accurately measure and adjust the alignment in view of the traveling state of the vehicle, the alignment needs to be measured and adjusted based on these characteristics of the tires.

For example, Patent Document 2 describes a technique of measuring and adjusting the alignment based on characteristics of tires. In this technique, two or more roller pairs are used to drive wheels (tires), and forces respectively generated on the rollers are measured, and the toe angle and the camber angle are measured based on the directions of the measured forces.

Patent Document 1: Japanese Patent Application Publication No, JP-A-H06-11420

Patent Document 2: Japanese Patent Publication No. JP-B-S51-1868

DISCLOSURE OF THE INVENTION

Problem to be Solved by the Invention

However, the above related art has the following problem. A force, which is generated between the tire and the road surface when the vehicle is traveling, varies according to the shape of the contact area between the tire and the road surface. However, the shape of the contact area between the tire and the roller is significantly different from that of the contact area between the tire and the road surface that can be regarded as a substantially flat surface. Thus, characteristics of a force that is generated on the roller is different from those of a force that is generated on the road surface, whereby the alignment cannot be measured and adjusted with sufficient accuracy in an actual traveling state of the vehicle.

Regarding particularly the toe angle, even slight misalignment (e.g., 0.1°) greatly affects the travel resistance. Thus, fuel consumption performance is significantly deteriorated if the vehicle travels in a misaligned state. Therefore, techniques for accurately measuring and adjusting the alignment have been required in order to improve the fuel consumption as well.

As described above, however, in the above related art, the alignment cannot be accurately measured and adjusted when the vehicle is traveling. Thus, it is difficult to reduce the travel resistance, whereby the fuel consumption performance cannot be improved. Even if the alignment can be accurately measured and adjusted when the vehicle is traveling in the above related art, the state where the alignment has been adjusted does not necessarily correspond to an optimal state of the fuel consumption performance (the travel resistance). Thus, the fuel consumption performance cannot be sufficiently improved.

The present invention has been developed to solve the above problems, and it is an object of the present invention to provide a control apparatus capable of achieving proper alignment of wheels when a vehicle is traveling, thereby improving fuel consumption performance.

Means for Solving the Problem

In order to achieve the object, a control apparatus according to claim 1 is a control apparatus for use in a vehicle that includes a wheel, and an alignment adjustment apparatus for adjusting alignment of the wheel. The control apparatus includes: travel resistance detecting means for detecting a travel resistance of the vehicle; and alignment control means for controlling the alignment adjustment apparatus so as to reduce the travel resistance that is detected by the travel resistance detecting means.

According to the control apparatus of claim 2, in the control apparatus of claim 1, the vehicle includes a rotation drive apparatus for applying a rotation driving force to the wheel, and the travel resistance detecting means detects the travel resistance based on a driving state of the rotation drive apparatus.

According to the control apparatus of claim 3, in the control apparatus of claim 2, the rotation drive apparatus is an electric motor, and the travel resistance detecting means detects the travel resistance based on a current value that is supplied to the rotation drive apparatus.

According to the control apparatus of claim 4, in the control apparatus of claim 2 or 3, the control apparatus further includes state determining means for determining if a state where the vehicle is traveling is a state where there is no change in the travel resistance, and detection of the travel resistance of the vehicle by the travel resistance detecting means is performed when it is determined by the state determining means that the state where the vehicle is traveling is the state where there is no change in the travel resistance.

According to the control apparatus of claim 5, in the control apparatus of any one of claims 1 to 4, the alignment adjustment apparatus of the vehicle includes: a camber shaft that serves as a central axis when changing a camber angle of the wheel, and is positioned so as to be tilted downward or upward along a longitudinal direction of the vehicle; and a steering drive apparatus for driving the wheel so as to steer the wheel about the camber shaft. When the wheel is driven to be steered about the camber shaft by the steering drive apparatus, the camber angle of the wheel is changed, and a toe angle of the wheel is changed. The alignment control means controls the steering drive apparatus.

According to the control apparatus of claim 6, in the control apparatus of any one of claims 1 to 5, the vehicle includes left and right wheels, and the alignment control means controls the alignment adjustment apparatus so as to bring the left and right wheels into a toe-in state or a toe-out state.

According to the control apparatus of claim 7, in the control apparatus of any one of claims 1 to 6, the vehicle includes left and right front wheels, and left and right rear wheels, and the travel resistance detecting means includes: first detecting means for detecting the travel resistance of the vehicle when only alignment of one of the left and right front wheels and the left and right rear wheels has been adjusted; and second detecting means for detecting the travel resistance of the vehicle when only alignment of the other of the left and right front wheels and the left and right rear wheels has been adjusted.

Effects of the Invention

According to the control apparatus of claim 1, the alignment control means controls the operating state of the alignment adjustment apparatus when the vehicle is traveling. After the alignment of the wheels is adjusted, the travel resistance of the vehicle is increased or decreased according to the alignment state of the wheels.

According to the present invention, the control apparatus includes the travel resistance detecting means for detecting the travel resistance of the vehicle, and the alignment control means controls the alignment adjustment apparatus based on the detection result of the travel resistance detecting means. That is, the alignment control means controls the alignment adjustment apparatus so that the travel resistance of the vehicle decreases. Thus, the alignment of the wheels when the vehicle is traveling can be adjusted to a proper state, whereby the fuel consumption performance can be improved.

According to the present invention, the alignment control means controls the alignment adjustment apparatus based on the detection result of the travel resistance detecting means. This eliminates the need to provide a sensor apparatus for detecting the alignment state of the wheels, whereby the overall product cost of the vehicle can be reduced accordingly.

Thus, the alignment control means does not control the alignment adjustment apparatus based on the alignment state detected by the sensor apparatus, but based on the travel resistance of the vehicle. Thus, the fuel consumption performance can be improved appropriately.

That is, in the case where the alignment state is detected by the sensor apparatus, detection accuracy of the sensor apparatus varies due to attachment accuracy of parts such as a suspension apparatus, deterioration of the tires due to aging and wear of the tires, and the like. Thus, a proper alignment state cannot be obtained by controlling the alignment adjustment apparatus based on the detection result of the sensor apparatus, and the travel resistance cannot be reduced sufficiently.

On the other hand, according to the present invention, the alignment adjustment apparatus is controlled based on the detection result of the travel resistance detecting means. Thus, a proper alignment state can be obtained even if vehicle parts such as a suspension apparatus is not attached with satisfactory accuracy, and tires have deteriorated due to aging or have worn, and the like. Thus, the travel resistance can be reliably reduced. As a result, the fuel consumption performance can be improved.

According to the control apparatus of claim 2, the following effect is obtained in addition to the effects obtained by the control apparatus of claim 1. In the control apparatus of claim 2, the vehicle includes the rotation drive apparatus for applying the rotation driving force to the wheels, and the travel resistance detecting means detects the travel resistance of the vehicle based on the driving state of the rotation drive apparatus. Thus, the rotation drive apparatus can be made to have two functions, which are a function as a driving source for applying the rotation driving force to the wheels, and a function as a detection apparatus for detecting the travel resistance of the vehicle. This eliminates the need to separately provide a sensor apparatus (a detection apparatus) for detecting the travel resistance of the vehicle, whereby the overall product cost of the vehicle can be reduced accordingly.

Note that examples of the rotation drive apparatus include a reciprocating engine, a diesel engine, a rotary engine, a hybrid engine, an electric motor, a hydraulic motor, and the like. In the case where the rotation drive apparatus is any of the engines, the driving state of the rotation drive apparatus corresponds to the amount of fuel that is supplied to the engine. In the case where the rotation drive apparatus is any motor, the driving state of the rotation drive apparatus corresponds to a current value or a hydraulic force that is supplied to the motor.

According to the control apparatus of claim 3, the following effect is obtained in addition to the effects obtained by the control apparatus of claim 2. In the control apparatus of claim 3, the rotation drive apparatus is an electric motor, and the travel resistance detecting means detects the travel resistance based on a current value that is supplied to the rotation drive apparatus. Thus, the travel resistance of the vehicle can be more accurately detected as compared to, e.g., the case where the travel resistance is detected based on the amount of fuel that is supplied to the engine.

According to the control apparatus of claim 4, the following effect is obtained in addition to the effects obtained by the control apparatus of claim 2 or 3. In the control apparatus of claim 4, the control apparatus further includes the state determining means for determining if the traveling state of the vehicle is a state where there is no change in travel resistance, and detection of the travel resistance of the vehicle by the travel resistance detecting means is performed when it is determined by the state determining means that the traveling state of the vehicle is the state where there is no change in the travel resistance. Thus, the travel resistance can be more accurately detected in the case where the travel resistance is detected based on the driving state of the rotation drive apparatus (the current value that is supplied to the electric motor).

Note that the state where there is no change in the travel resistance does not mean that there needs to be no change in the travel resistance that is actually measured, but means that the traveling state of the vehicle need only be close to an ideal state on a chassis that is free from disturbance. Specific examples of the state where there is no change in the travel resistance include: the state where the autocruise function has been activated and thus, the vehicle has not been accelerated or decelerated, and a constant traveling speed of the vehicle is maintained (or the traveling speed of the vehicle is controlled so as to vary within a predetermined range (e.g., ±3 km/h); the state where there is no change in air resistance that is applied to the vehicle (or the air resistance varies within a predetermined range (e.g., ±5%); the state where the gradient of the road on which the vehicle is traveling does not change as the vehicle travels due to an uphill or downhill road or the like (or the gradient varies within a predetermined range (e.g., 5%); the state where a constant rolling resistance of the wheels is maintained (or the rolling resistance of the wheels is controlled to vary within a predetermined range (e.g., ±5%); the state where a steering wheel is not operated (or the steering angle of the steering wheel varies within a predetermined range (e.g., ±3 degrees), and there is no change in thrust force and rolling resistance (or the thrust force and the rolling resistance vary within a predetermined range (e.g., ±5%); the state where the vehicle is not tilted laterally (or the tilt angle of the vehicle in the lateral direction is within a predetermined range (e.g., ±3 degrees); and the state where the rotation drive apparatus rotates at a constant rotational speed (or the rotational speed of the rotation drive apparatus varies within a predetermined range (e.g., ±5%).

According to the control apparatus of claim 5, the following effect is obtained in addition to the effects obtained by the control apparatus of any one of claims 1 to 4. In the control apparatus of claim 5, the alignment adjustment apparatus of the vehicle includes: the camber shaft that serves as a central axis when changing the camber angle of the wheels, and is positioned so as to be tilted downward or upward along the longitudinal direction of the vehicle; and the steering drive apparatus for driving the wheels so as to steer the wheels about the camber shaft. When the steering drive apparatus is controlled by the alignment control means, and the wheels are driven to be steered about the camber shaft, the camber angle of the wheels is changed, and the toe angle of the wheels is changed. Thus, the toe angle can also be adjusted by merely providing a mechanism for adjusting the camber angle. This eliminates the need to separately provide a mechanism for adjusting the toe angle. Thus, the number of parts is reduced accordingly, whereby the overall weight and the overall product cost of the vehicle can be reduced. In particular, in the structure in which the steering operation is performed only by the front wheels and no steering operation is performed by the rear wheels, it is effective since no mechanism for adjusting the toe angle need be separately provided for the rear wheels.

According to the control apparatus of claim 6, the following effect is obtained in addition to the effects obtained by the control apparatus of any one of claims 1 to 5. In the control apparatus of claim 6, the vehicle includes left and right wheels and the alignment control means controls the alignment adjustment apparatus so as to bring the left and right wheels into the toe-in state or the toe-out state. Thus, in the case where the alignment adjustment apparatus is controlled simultaneously for the left and right wheels, respective cornering forces, which are generated on the left and right wheels, can be cancelled by the left and right wheels. As a result, straight traveling stability of the vehicle can be ensured.

According to the control apparatus of claim 7, the following effect is obtained in addition to the effects obtained by the control apparatus of any one of claims 1 to 6. In the control apparatus of claim 7, the vehicle includes left and right front wheels, and left and right rear wheels, and the travel resistance detecting means includes: the first detecting means for detecting the travel resistance of the vehicle when only alignment of one of the left and right front wheels, and the left and right rear wheels has been adjusted; and the second detecting means for detecting the travel resistance of the vehicle when only alignment of the other of the left and right front wheels, and the left and right rear wheels has been adjusted. Thus, the influence on the travel resistance of the vehicle due to the front wheels, and the influence on the travel resistance of the vehicle due to the rear wheels can be separately determined based on the respective detection results of the first detecting means and the second detecting means.

Thus, in the case where the alignment adjustment apparatus is controlled by the alignment control means, the alignment of the front wheels and the alignment of the rear wheels are separately adjusted based on the respective detection results of the first and second detecting means, whereby a more proper alignment state can be obtained. Thus, the travel resistance of the vehicle can be appropriately reduced, whereby the fuel consumption performance can be efficiently improved.

BRIEF DESCRIPTION OF THE DRAWINGS

FIGS. 6A and 6B are flowcharts illustrating an optimal angle adjustment process.

Figure 1:
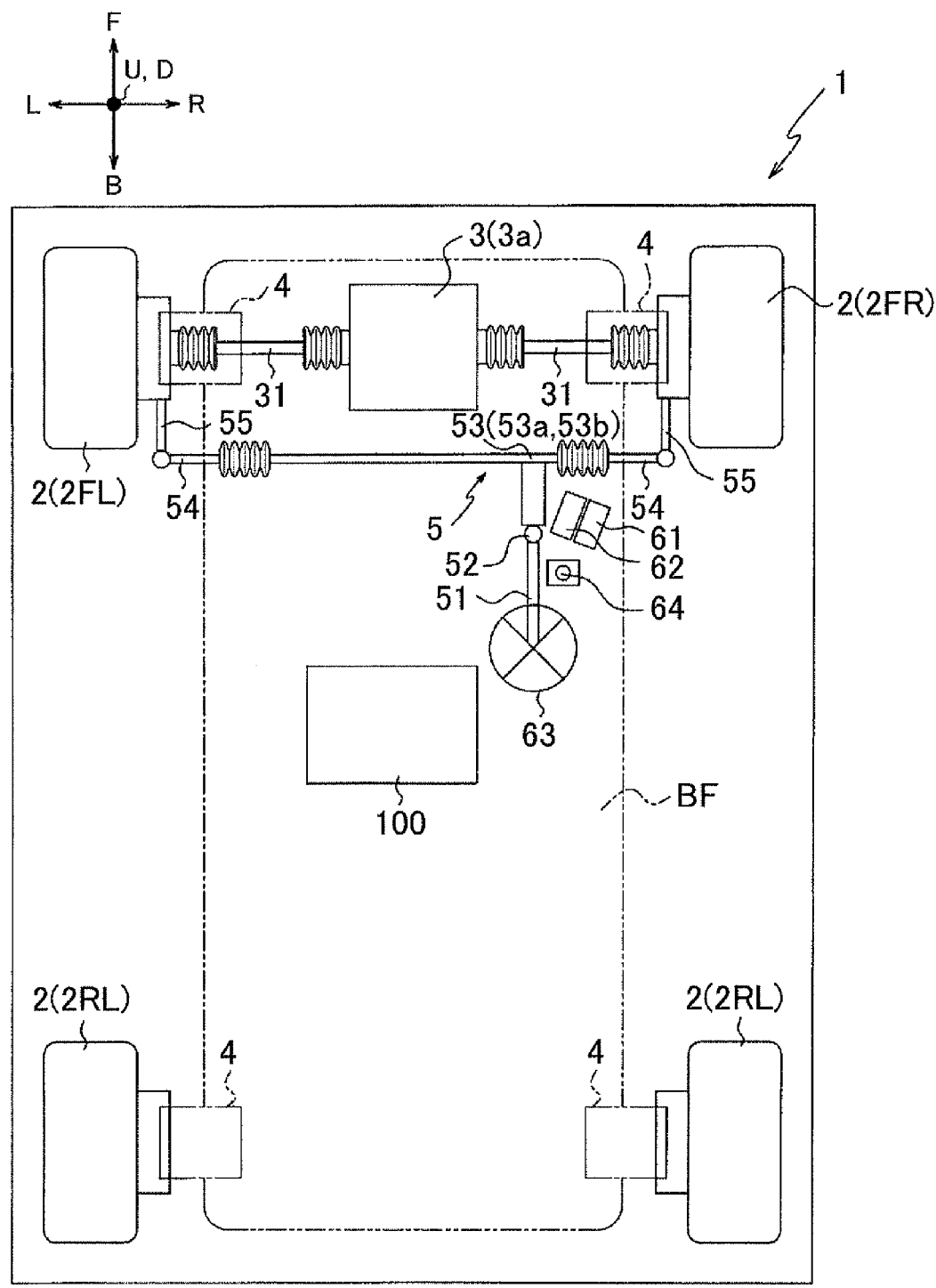
FIG. 1 is a diagram schematically showing a vehicle on which a control apparatus according to a first embodiment of the present invention is mounted.

DESCRIPTION OF THE REFERENCE NUMERALS 100 control apparatus
1 vehicle
2 wheel
2FL left front wheel (a part of wheels)
2FR right front wheel (a part of wheels)
2RL left rear wheel (a part of wheels)
2RR right rear wheel (a part of wheels)
3 wheel drive apparatus (rotation drive apparatus)
3a electric motor
4, 204 suspension apparatus (alignment adjustment apparatus)
45, 245 camber shaft
44FL to 44RR FL to RR actuator (steering drive apparatus)
246FR FR actuator (steering drive apparatus)

BEST MODES FOR CARRYING OUT THE INVENTION

Preferred embodiments of the present invention will be described below with reference to the accompanying drawings. FIG. 1 is a diagram schematically showing a vehicle 1 to which a control apparatus 100 of a first embodiment of the present invention is mounted. Note that arrows U-D, L-R, and F-B in FIG. 1 indicate the vertical, lateral, and longitudinal direction of the vehicle 1, respectively.

First, the general structure of the vehicle 1 will be described. As shown in FIG. 1, the vehicle 1 mainly includes: a vehicle body frame BF; a plurality of (four in the present embodiment) wheels 2 supported by the vehicle body frame BF; a wheel drive apparatus 3 for rotation driving a part of the wheels 2 (left and right front wheels 2FL, 2FR in the present embodiment); suspension apparatuses 4 for suspending the wheels 2 from the vehicle body frame BF in a floatable manner, respectively; and a steering device 5 as a steering apparatus for transmitting a steering operation of a steering wheel 63 to the wheels 2. The vehicle 1 is structured to adjust the alignment of the wheels 2 to reduce the travel resistance of the vehicle 1 so that the fuel consumption performance can be improved.

The detailed structure of each part will be described below. As shown in FIG. 1, the wheels 2 are four wheels, which are left and right front wheels 2FL, 2FR located on the front side in the traveling direction of the vehicle 1, and left and right rear wheels 2RL, 2RR located on the rear side in the traveling direction. Note that the left and right front wheels 2FL, 2FR are structured as drive wheels that are rotation driven by a rotation driving force that is applied from the wheel drive apparatus 3. On the other hand, the left and right rear wheels 2RL, 2RR are structured as driven wheels that are driven as the vehicle 1 travels.

As described above, the wheel drive apparatus 3 is a rotation drive apparatus for rotation driving the left and right front wheels 2FL, 2FR, and is formed by an electric motor 3a as described below (see FIG. 4). As shown in FIG. 1, the electric motor 3a is connected to the left and right front wheels 2FL, 2FR via a differential gear (not shown) and a pair of drive shafts 31.

When the driver operates an accelerator pedal 61, a rotation driving force is applied from the wheel drive apparatus 3 to the left and right front wheels 2FL, 2FR, and the left and right front wheels 2FL, 2FR are rotated at a rotational speed corresponding to the amount by which the accelerator pedal 61 is operated. The difference in rotation between the left and right front wheels 2FL, 2FR is absorbed by the differential gear.

As described above, the wheels 2 (the front and rear wheels 2FL to 2RR) are floatably coupled to the vehicle body frame BF by the suspension apparatuses 4. The suspension apparatuses 4 are parts that function as a so-called suspension, and as shown in FIG. 1, are respectively disposed at four positions corresponding to the wheels 2. The suspension apparatuses 4 of the present embodiment are structured to function also as an alignment adjustment apparatus for adjusting the alignment (a toe angle and a camber angle) of the wheel 2.

Figures 2A, 2B:
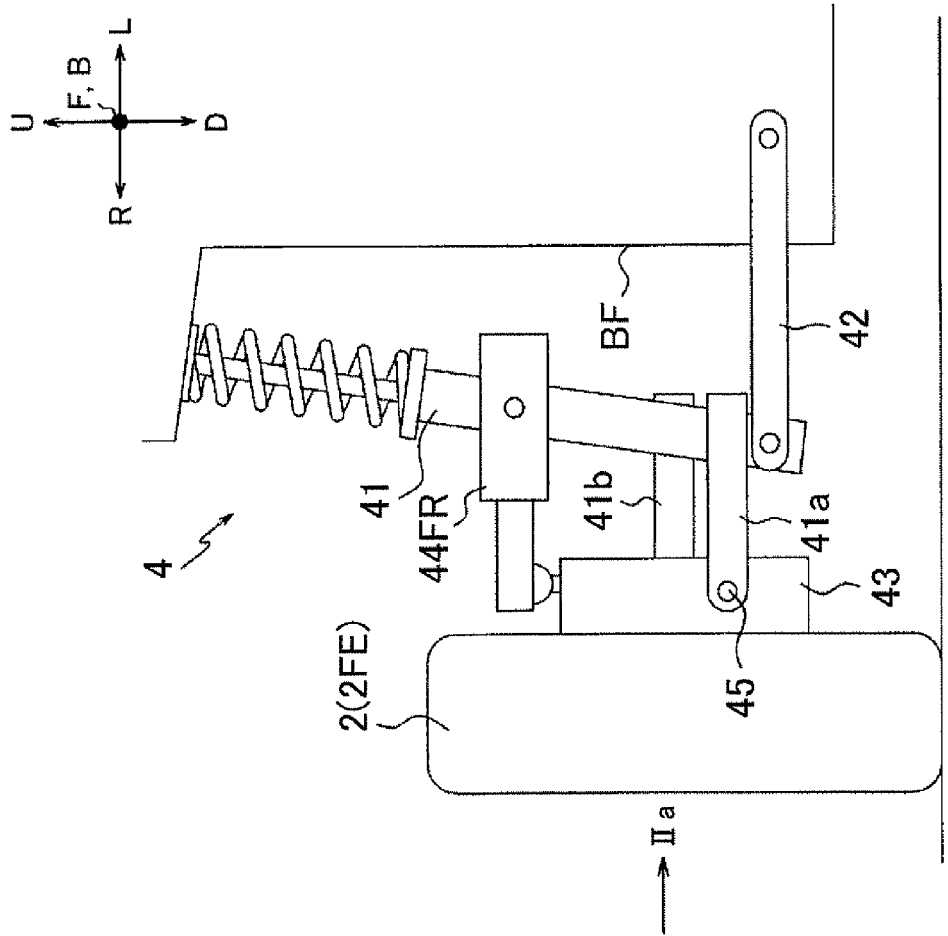
FIG. 2A is a side view of a wheel.
FIG. 2B is a front view of a suspension apparatus.
Figure 3A:
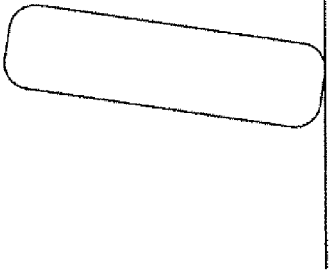
FIGS. 3A and 3D are side views of a wheel.

The detailed structure of the suspension apparatus 4 will be described below with reference to FIGS. 2 and 3. FIG. 2A is a side view of the wheel 2, and FIG. 2B is a front view of the suspension apparatus 4. FIGS. 3A and 3D are side views of the wheel 2, and FIGS. 3B, 3C, 3E, and 3F are front views of the wheel 2.

Note that FIG. 2A corresponds to a side view of the wheel 2 as viewed in the direction shown by arrow IIa in FIG. 2B. FIGS. 3E and 3F correspond to front views of the wheel 2 as viewed in the direction shown by arrow A in FIG. 3D. Arrows U-D, L-R, and F-B in FIGS. 2 and 3 indicate the vertical, lateral, and longitudinal directions of the vehicle 1, respectively.

Since each suspension apparatus 4 has the same structure, the suspension apparatus 4 corresponding to the right front wheel 2FR is shown in FIG. 2B as a representative example. It should be noted that the drive shaft 31, a tie rod 54, and the like are not shown in FIG. 2B in order to simplify the drawing and to facilitate understanding.

As shown in FIG. 2B, the suspension apparatus 4 is a so-called strut suspension, and mainly includes a shock absorber 41, a control arm 42, an axle carrier 43, an FR actuator 44FR, and a camber shaft 45.

The shock absorber 41 is structured as a so-called damper apparatus, and functions also as a support. As shown in FIG. 2B, an upper end (the upper side in FIG. 2B) of the shock absorber 41 is coupled to the vehicle body frame BF, while a lower end thereof (the lower side in FIG. 2B) is coupled to the vehicle body frame BF via the control arm 42.

As shown in FIG. 2B, the shock absorber 41 has a first coupling arm 41a and a second coupling arm 41b. The first coupling arm 41a and the second coupling arm 41b are members for coupling the axle carrier 43 to the shock absorber 41. Respective one ends (the right side in FIG. 2B) of the first coupling arm 41a and the second coupling arm 41b are fixed to the lower end side of the shock absorber 41, and the other ends thereof (the left side in FIG. 2B) are rotatably shaft-supported by the axle carrier 43 via the camber shaft 45.

As described above, the control arm 42 is a member for coupling the lower end of the shock absorber 41 to the vehicle body frame BF. As shown in FIG. 2B, one end (the right side in FIG. 2B) of the control arm 42 is rotatably shaft-supported by the vehicle body frame BF via a rubber bush (not shown), and the other end thereof (the left side in FIG. 2B) is rotatably shaft-supported by the shock absorber 41 via a rubber bush (not shown).

The axle carrier 43 is a member for rotatably shaft-supporting the wheel 2. As shown in FIG. 2B, the axle carrier 43 is coupled to the shock absorber 41 via the first and second coupling arms 41a, 41b and the FR actuator 44FR.

The FR actuator 44FR is a drive apparatus coupling the shock absorber 41 and the axle carrier 43 with each other, for adjusting the gap between these members 41, 43, and is structured as a hydraulic cylinder. As shown in FIG. 2B, a main body portion (the right side in FIG. 2B) of the FR actuator 44FR is rotatably shaft-supported by the shock absorber 41, and a rod portion (the left side in FIG. 2B) of the FR actuator 44FR is pivotally coupled with the axle carrier 43 via a ball joint.

As shown in FIG. 2B, the camber shaft 45 is a shaft member for rotatably shaft-supporting the axle carrier 43 by the first coupling arm 41a and the second coupling arm 41b. When the FR actuator 44FR described above is driven to extend or retract, the wheel 2 is driven to be steered about the camber shaft 45.

In the state where the wheel 2 is not steered, the camber shaft 45 is positioned along the longitudinal direction of the vehicle 1 (the direction shown by arrow F-B) as viewed in the vertical direction of the vehicle 1 (the direction shown by arrow U-D; see FIG. 1), and as shown in FIG. 2A, is tilted in the downward direction of the vehicle 1 (the direction shown by arrow D) (is tilted downward) from the rear side to the front side of the vehicle (from left to right in FIG. 2A) as viewed from the lateral direction of the vehicle 1 (as viewed from the direction shown by arrow L-R).

Thus, when the FR actuator 44FR is driven to extend or retract, the wheel 2 is driven to be steered (is driven to swing) about the camber shaft 45. As a result, a predetermined camber angle and a predetermined toe angle are applied to the wheel 2.

Figure 3B:
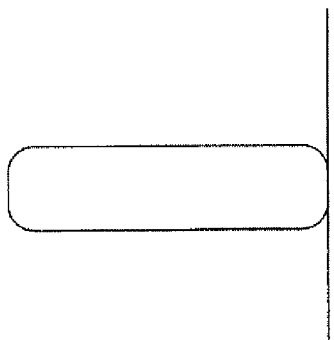
FIGS. 3B, 3C, 3E, and 3F are front views of the wheel.
Figure 3C:
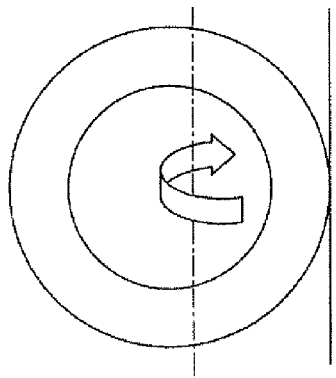
Figure 3D:
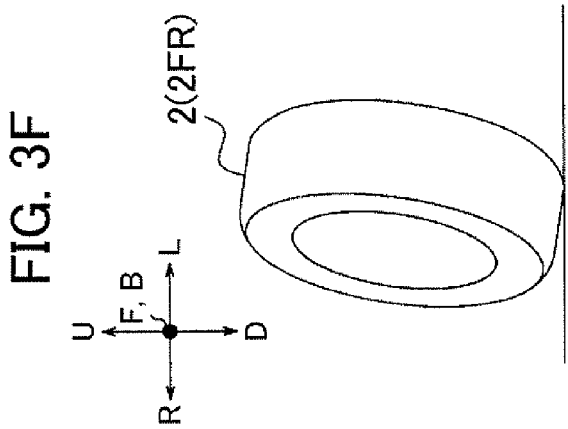
Figure 3E:
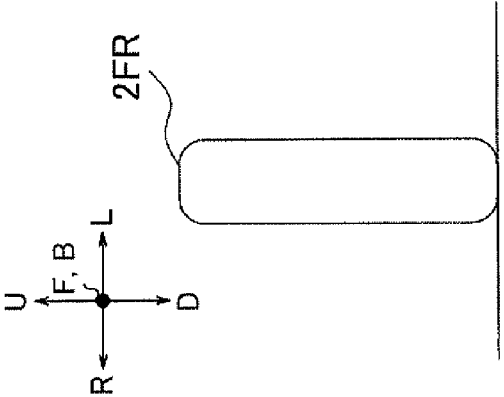
Figure 3F:
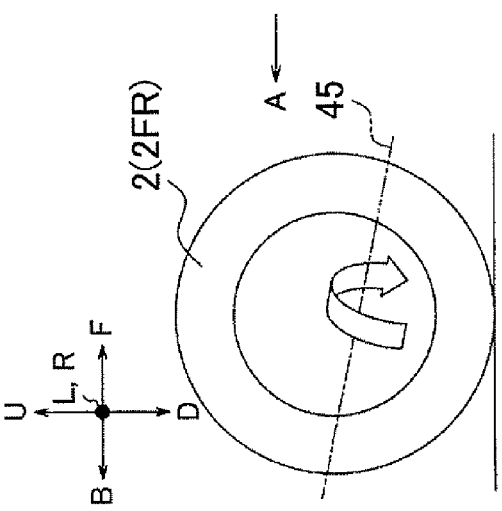

For example, in the case where the camber shaft is not tilted (is tilted neither downward nor upward) as viewed in the lateral direction of the vehicle 1 (the direction shown by arrow L-R), as shown in FIG. 3A, only a predetermined camber angle is applied to the wheel 2, and the toe angle is not changed, as shown in FIG. 3C, even if the wheel 2 is driven to be steered (is driven to swing) from the state of FIG. 3B by driving the FR actuator 44FR to retract.

On the other hand, in the present embodiment, the camber shaft 45 is tilted as viewed in the lateral direction of the vehicle 1 (as viewed in the direction shown by arrow L-R), as shown in FIG. 3D. Thus, when the wheel 2 is driven to be steered (is driven to swing) from the state of FIG. 3E by driving the FR actuator FR to retract, the wheel 2 is steered about the camber shaft 45, whereby the camber angle and the toe angle can be simultaneously applied to the wheel 2, as shown in FIG. 3F.

That is, in the present embodiment, the tow angle in a tow-in direction can be applied to the wheel 2, as shown in FIG. 3F, by applying the camber angle in a negative direction (a negative camber) to the wheel 2, whereas the toe angle in a tow-out direction can be applied to the wheel 2 by applying the camber angle in a positive direction (a positive camber) to the wheel 2.

Referring back to FIG. 1, the steering device 5 is a rack and pinion steering device for steering the left and right front wheels 2FL, 2FR according to an operation of the steering wheel 63 described below when the steering wheel 63 is operated by the driver. In this steering device 5, the steering operation (rotation) by the driver is first transmitted as a rotational motion to a pinion 53a of a steering box 53 via a steering column 51, with the angle of the steering operation being changed by a universal joint 52. The rotational motion transmitted to the pinion 53a is converted to a linear motion of a rack 53b. This linear motion laterally moves tie rods 54 that are respectively connected to both ends of the rack 53b, thereby pushing and pulling knuckles 55. Thus, a predetermined steering angle is applied to the wheels 2.

The accelerator pedal 61 and a brake pedal 62 are operation members that are operated by the driver. The traveling speed and the braking force of the vehicle 1 are determined according to the depressing state of each pedal 61, 62 (such as the amount by which each pedal 61, 62 is depressed, and the speed at which each pedal 61, 62 is depressed), whereby an operation of the wheel drive apparatus 3 is controlled. The steering wheel 63 is an operation member that is operated by the driver. The steering device 5 performs a steering operation according to the operating state of the steering wheel 63 (such as the rotational angle and the rotational speed).

A correction mode switch 64 is an operation member that is operated by the driver. Whether autocruise is activated or deactivated is determined according to the operating state (ON/OFF) of the correction mode switch 64. Note that the "autocruise" is a function to maintain a preset traveling speed of the vehicle 1. The ON state of the correction mode switch 64 corresponds to the state where activation of the autocruise has been selected by the driver, and the OFF state of the correction mode switch 64 corresponds to the state where activation of the autocruise has not been selected by the driver (the state where deactivation of the autocruise has been selected by the driver).

The control apparatus 100 is a control apparatus for controlling each part of the vehicle 1 structured as described above. For example, the control apparatus 100 controls the rotational speed of each wheel 2 by detecting the operating state of each pedal 61, 62, and operating the wheel drive apparatus 3 according to the detection result.

Alternatively, the control apparatus 100 adjusts the alignment of each wheel 2 by detecting the respective operating states of the accelerator pedal 61, the brake pedal 62, and the steering wheel 63, and operating a steering drive apparatus 44 (see FIG. 4) according to the detection result. Thus, the control apparatus 100 reduces the travel resistance, and improves the fuel consumption performance. The detailed structure of the control apparatus 100 will be described below with reference to FIG. 4.

Figure 4:
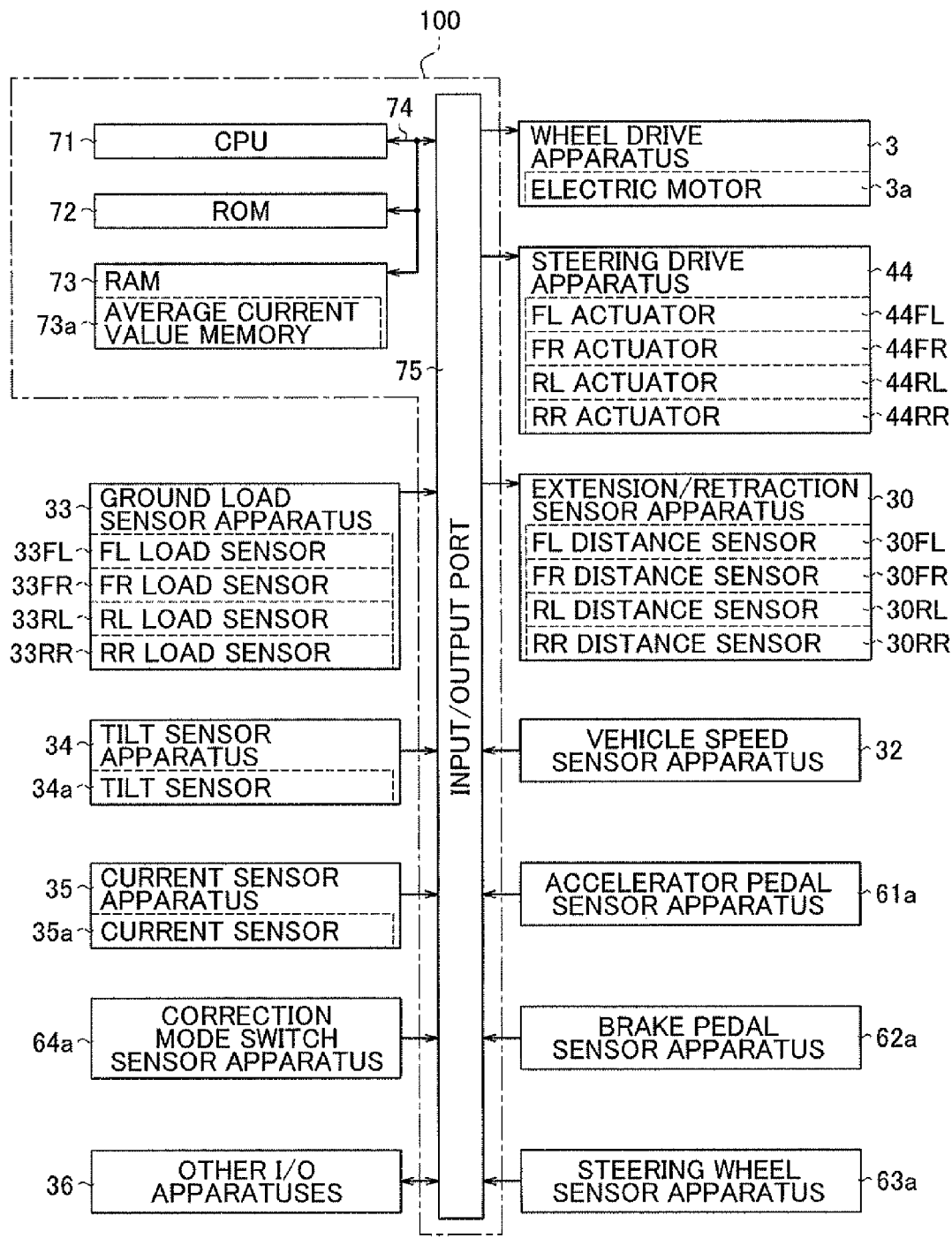
FIG. 4 is a block diagram showing an electrical structure of the control apparatus.

FIG. 4 is a block diagram showing an electrical structure of the control apparatus 100. As shown in FIG. 4, the control apparatus 100 includes a central processing unit (CPU) 71, a read only memory (ROM) 72, and a random access memory (RAM) 73, which are connected to an input/output (I/O) port 75 via bus lines 74. A plurality of apparatuses, such as the wheel drive apparatus 3, are also connected to the I/O port 75.

The CPU 71 is an arithmetic unit for controlling each part connected by the bus lines 74. The ROM 72 is a non-rewritable non-volatile memory where control programs that are executed by the CPU 71, fixed value data, and the like have been stored. The RAM 73 is a memory for storing various data in a rewritable manner when the control programs are executed.

Figure 5:
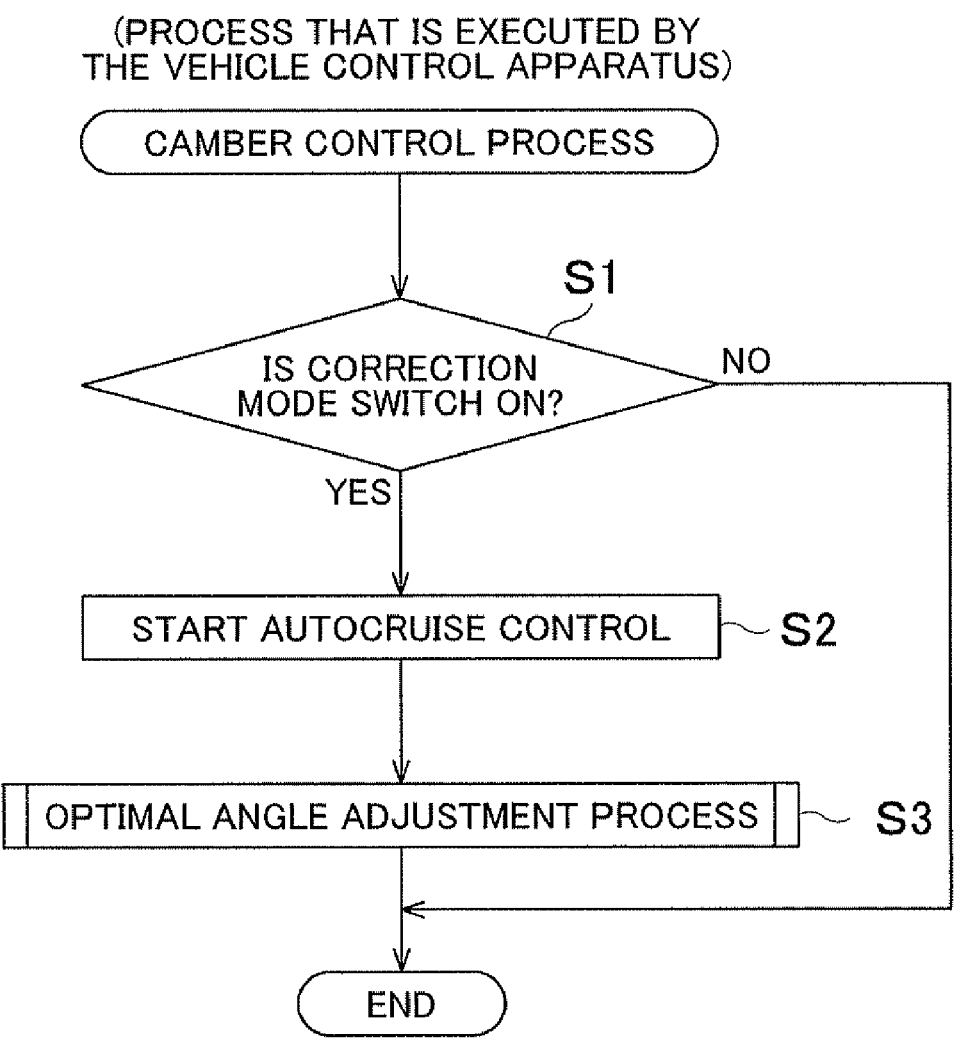
FIG. 5 is a flowchart illustrating a camber control process.
Figure 7:
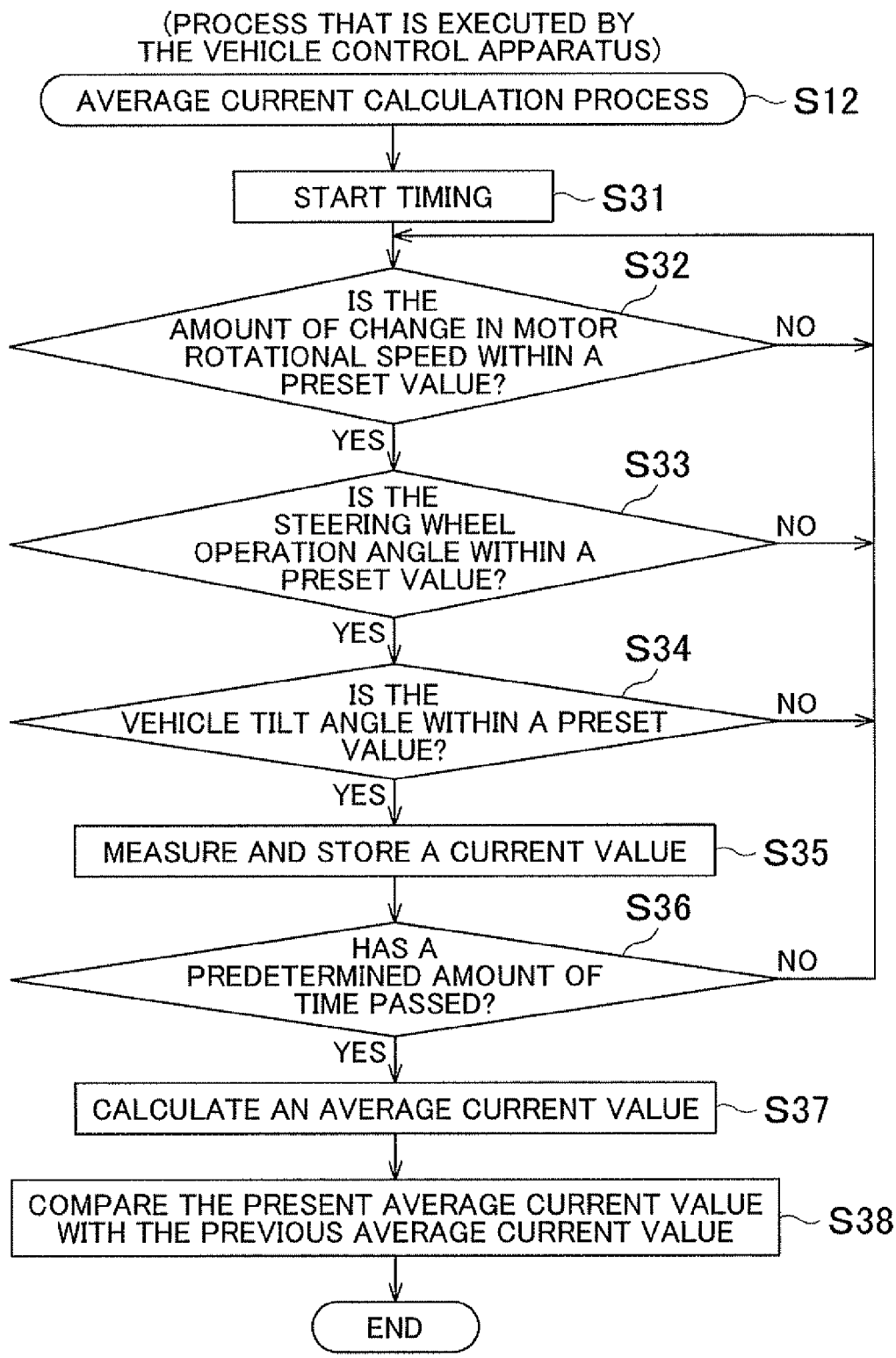
FIG. 7 is a flowchart illustrating an average current calculation process.

Note that programs of the flowcharts shown in FIGS. 5 through 7 (a camber control process and the like) have been stored in the ROM 72, The RAM 73 is provided with an average current value memory 73a.

As described above, the wheel drive apparatus 3 is an apparatus for rotation driving the left and right front wheels 2FL, 2FR (see FIG. 1). The wheel drive apparatus 3 mainly includes the electric motor 3a for applying a rotation driving force to the left and right front wheels 2FL, 2FR, and a drive circuit (not shown) for controlling driving of the electric motor 3a based on commands from the CPU 71. Note that the wheel drive apparatus 3 is structured to function as a regenerative apparatus.

As described above, the steering drive apparatus 44 is a drive apparatus for adjusting the alignment (the camber angle and the toe angle) of each wheel 2. The steering drive apparatus 44 mainly includes four FL to RR actuators 44FL to 44RR for applying a driving force for driving the wheels 2 so as to steer the wheels 2, respectively, and a drive circuit (not shown) for controlling driving of the actuators 44FL to 44RR based on commands from the CPU 71.

Note that, as described above, each of the FL to RR actuators 44FL to 44RR is structured as a hydraulic cylinder, and mainly includes a hydraulic pump (not shown) for supplying oil (an oil pressure) to the hydraulic cylinder, and an electromagnetic valve (not shown) for switching the direction in which oil is supplied from the hydraulic pump to the hydraulic cylinder.

When the drive circuit of the steering drive apparatus 44 controls driving of the hydraulic pumps based on commands from the CPU 71, the hydraulic cylinders (the FL to RR actuators 44FL to 44RR) are driven to extend or retract by oil (an oil pressure) that is supplied from the respective hydraulic pumps. The driving direction (extension or retraction) of the hydraulic cylinders (the FL to RR actuators 44FL to 44RR) is switched by turning the respective electromagnetic valves ON and OFF.

In the drive circuit of the steering drive apparatus 44, the extension or retraction amount of the hydraulic cylinders (the FL to RR actuators 44FL to 44RR) is monitored by an extension/retraction sensor apparatus 30 described later. Extension/retraction driving of the hydraulic cylinders 4a to 4c is stopped when the extension/retraction amount of the hydraulic cylinder 4a to 4c reaches a target value (an extension/ retraction amount) indicated by the CPU 71. Note that the detection result of the extension/retraction sensor apparatus 30 is output from the drive circuit to the CPU 71, so that the CPU 71 can obtain the present camber angle (and the present toe angle) of each wheel 2 and the amount of change thereof, based on the detection result.

A vehicle speed sensor apparatus 32 is an apparatus for detecting the ground speed (an absolute value and the traveling direction) of the vehicle 1 with respect to the road surface, and outputting the detection result to the CPU 71. The vehicle speed sensor apparatus 32 mainly includes a total of four wheel speed sensors (not shown) respectively attached to the wheels 2, and a control circuit (not shown) for processing the detection result of each wheel speed sensor and outputting the processing result to the CPU 71. The CPU 71 obtains the ground speed from an average value of the detection results respectively received from the four wheel speed sensors of the vehicle speed sensor apparatus 32.

A vertical load sensor apparatus 33 is an apparatus for detecting the load that is received by the contact surface of each wheel 2 from the road surface, and outputting the detection result to the CPU 71. The vertical load sensor apparatus 33 includes FL to RR load sensors 33FL to 33RR for detecting the load received by the wheels 2, respectively, and a processing circuit (not shown) for processing the detection result of each load sensor 33FL to 33RR, and outputting the processing result to the CPU 71.

Note that, in the present embodiment, each load sensor 33FL to 33RR is structured as a piezo-resistive three-axis load sensor. Each load sensor 33FL to 33RR is provided on the shaft of the shock absorber 41 of a corresponding one of the wheels 2, and detects the load received by the wheel 2 from the road surface in three directions, which are the longitudinal direction (the direction shown by arrow F-B), the lateral direction (the direction shown by arrow L-R), and the vertical direction (the direction shown by arrow U-D) of the vehicle 1 (see FIG. 2B).

A tilt sensor apparatus 34 is an apparatus for detecting the tilt of the vehicle 1 with respect to a horizontal plane (that is, the tilt of the road surface on which the vehicle 1 is traveling) and outputting the detection result to the CPU 71. The tilt sensor apparatus 34 includes a tilt sensor 34a for detecting the tilt described above, and a processing circuit (not shown) for processing the detection result of the tilt sensor 34a and outputting the processing result to the CPU 71.

Note that, in the present embodiment, the tilt sensor 34a is structured as a sensor for detecting a change in liquid level, which is proportional to the tilt, as a change in capacitance and converting the detected change to an electric signal.

A current sensor apparatus 35 is an apparatus for detecting a current value supplied (energized) to the wheel drive apparatus 3 (the electric motor 3a) and outputting the detection result to the CPU 71. The current sensor apparatus 35 includes a current sensor 35a for detecting a current value supplied (energized) to the electric motor 3a, and a processing circuit (not shown) for processing the detection result of the current sensor 35a and outputting the processing result to the CPU 71.

The CPU 71 stores the detection result (the current value) of the current sensor 35a received from the current sensor apparatus 35 in the average current value memory 73a, and calculates an average value (an average current value) of a plurality of detection results based on the data stored in the average current value memory 73a.

An accelerator pedal sensor apparatus 61a is an apparatus for detecting the operating state of the accelerator pedal 61 and outputting the detection result to the CPU 71. The accelerator pedal sensor apparatus 61a mainly includes an angle sensor (not shown) for detecting the depressing state of the accelerator pedal 61, and a control circuit (not shown) for processing the detection result of the angle sensor and outputting the processing result to the CPU 71.

A brake pedal sensor apparatus 62a is an apparatus for detecting the operating state of the brake pedal 62 and outputting the detection result to the CPU 71. The brake pedal sensor apparatus 62a mainly includes an angle sensor (not shown) for detecting the depressing state of the brake pedal 62, and a control circuit (not shown) for processing the detection result of the angle sensor and outputting the processing result to the CPU 71.

A steering wheel sensor apparatus 63a is an apparatus for detecting the operating state of the steering wheel 63 and outputting the detection result to the CPU 71. The steering wheel sensor apparatus 63a mainly includes an angle sensor (not shown) for detecting the operating state of the steering wheel 63, and a control circuit (not shown) for processing the detection result of the angle sensor and outputting the processing result to the CPU 71.

Note that, in the present embodiment, each angle sensor is structured as a contact potentiometer using an electrical resistance. The CPU 71 can obtain the amount by which each pedal 61, 62 is depressed, and the angle by which the steering wheel 63 is operated, based on the detection results respectively received from the control circuits of the sensor apparatuses 61a to 63a. The CPU 71 can also obtain the speed at which each pedal 61, 62 is depressed (the speed at which each pedal 61, 62 is operated) and the rotational speed (the operating speed) of the steering wheel 63 by time-differentiating the detection results.

A correction mode switch sensor apparatus 64a is an apparatus for detecting the operating state of the correction mode switch 64, and outputting the detection result to the CPU 71. The correction mode switch sensor apparatus 64a mainly includes a positioning sensor (not shown) for detecting the operating state (the operating position) of the correction mode switch 64, and a control circuit (not shown) for processing the detection result of the positioning sensor and outputting the processing result to the CPU 71.

Examples of other I/O apparatuses 36 shown in FIG. 3 include a rainfall sensor for detecting rainfall, an optical sensor for detecting the state of the road surface G in a non-contact manner, and the like.

A camber control process will be described below with reference to FIGS. 5 through 7. FIG. 5 is a flowchart illustrating the camber control process. This process is a process that is executed repeatedly (e.g., at intervals of 0.2 ms) by the CPU 71 while the power of the control apparatus 100 is ON. In the camber control process, the camber angle to be applied to the wheels 2 is adjusted to achieve proper alignment of the wheels 2 when the vehicle is traveling. Thus, the travel resistance is reduced, and the fuel consumption performance is improved.

In the camber control process, the CPU 71 first determines if the correction mode switch 64 is ON or not (S1). This step is performed by checking the detection result of the correction mode switch sensor apparatus 64a (see FIG. 4) and obtaining the operating state of the correction mode switch 64 that is operated by the driver.

That is, as described above, if the correction mode switch 64 is ON, the CPU 71 determines that activation of the autocruise mode has been selected by the driver. If the correction mode switch 64 is OFF, the CPU 71 determines that activation of the autocruise has not been selected by the driver.

Thus, if it is determined in S1 that the correction mode switch 64 is not ON (is OFF) (S1: No), the autocruise need not be activated. Since the traveling speed of the vehicle 1 is not kept constant, it can be determined that adjustment of alignment cannot be performed. Thus, S2 and S3 are skipped, and the camber control process is terminated.

On the other hand, if it is determined in S1 that the correction mode switch 64 is ON (S1: Yes), it means that activation of the autocruise mode has been selected by the driver. Thus, the autocruise is activated, and in this state (the state where the traveling speed of the vehicle 1 is kept at a preset value), the autocruise is first started (S2), and an optimal angle adjustment process (S3) is then executed in order to adjust the alignment, whereby the camber control process is terminated.

The optimal angle adjustment process (S3) will be described below with reference to FIGS. 6A and 6B. FIGS. 6A and 613 are flowcharts illustrating the optimal angle adjustment process. This optimal angle adjustment process (S3) is a process for adjusting the alignment of the wheels 2 to reduce the travel resistance of the vehicle 1, thereby improving the fuel consumption performance.

In the optimal angle adjustment process (S3), the CPU 71 first applies a predetermined camber angle in the toe-in direction to the left and right front wheels 2FL, 2FR (S11) to adjust the alignment of the left and right front wheels 2FL, 2FR.

Note that, as described above, applying the camber angle in the toe-in direction corresponds to applying a camber angle in the negative direction (a negative camber) to the wheels 2 to apply a toe angle in the toe-in direction to the wheels 2 (see FIG. 3). In the present embodiment, the predetermined angle is set as 0.1°. This angle is measured by the extension/retraction sensor apparatus 30, as described above.

After the camber angle and the toe angle are applied to the wheels 2 to adjust the alignment of the wheels 2 in S11, an average current calculation process (S12) is executed to see how the travel resistance of the vehicle 1 has changed by the adjustment of the alignment. The average current calculation process (S12) will be described below with reference to FIG. 7.

FIG. 7 is a flowchart illustrating the average current calculation process. This average current calculation process (S12) is a process for detecting a current value (an average current value) that is supplied to the wheel drive apparatus 3 (the electric motor 3*a*). In order to increase the detection accuracy, the current value is detected only when predetermined conditions are satisfied.

In the average current calculation process (S12), the CPU 71 first starts timing (S31), and then, determines if the amount of change in rotational speed of the motor is within a preset value or not (S32). That is, the CPU 71 monitors the rotational speed of the wheel drive apparatus 3 (the electric motor 3*a*) to detect the amount of change in rotational speed, and determines if the detected amount of change is within the preset value (5% of the highest rotational speed in the present embodiment) or not.

If it is determined in S32 that the amount of change in rotational speed is not within the preset value (S32: No), it means that a driving force has been adjusted to maintain the autocruise state (the traveling state of the vehicle 1 where the preset traveling speed of the vehicle 1 is maintained; see S2 in FIG. 5), and the vehicle 1 has been subjected to an acceleration/deceleration resistance and an air resistance. Measurement accuracy is reduced if an average current value is measured in this state. Thus, in this case, the CPU 71 waits until the amount of change in rotational speed of the motor becomes within the preset value (S32: No).

On the other hand, if it is determined in S32 that the amount of change in rotational speed is within the present value (S32: Yes), it means that the preset traveling speed of the vehicle 1 has been maintained (the vehicle 1 is traveling at a constant speed). Since an average current can be accurately measured in this state, the process proceeds to S33 in order to check other conditions.

In S33, it is determined if the steering wheel operation angle is within a preset value or not (S33). That is, the CPU 71 monitors the steering wheel sensor apparatus 63*a* to determine if the operation angle of the steering wheel 63 is within the preset value (5° from the central position in the present embodiment) or not.

If it is determined in S33 that the steering wheel operation angle is not within the preset value (S33: No), it means that the vehicle 1 is turning, and a turning resistance is generated associated with generation of a cornering force. Measurement accuracy is reduced if an average current value is measured in this state. Thus, in this case, the CPU 71 waits until the steering wheel operation angle becomes within the preset value (S33: No).

On the other hand, if it is determined in S33 that the steering wheel operation angle is within the preset value (S33: Yes), it means that the vehicle 1 is traveling straight (or the turning radius is sufficiently large). Since an average current can be accurately measured in this state, the process proceeds to S34 in order to check other conditions.

In S34, it is determined if the vehicle tilt angle is within a preset value or not (S34). That is, the CPU 71 monitors the tilt sensor apparatus 34 (the tilt sensor 34*a*) to detect the tilt state of the vehicle 1 (that is, the tilt state of the road surface on which the vehicle 1 is traveling), and determines if the detected vehicle tilt angle is within the preset value (3° corresponding to the highest rotational speed in the present embodiment) or not.

If it is determined in S34 that the vehicle tilt angle is not within the preset value (S34: No), it means that the vehicle 1 (the road surface on which the vehicle 1 is traveling) has been tilted significantly, and has been subjected to a grade resistance. Measurement accuracy is reduced if an average current value is measured in this state. Thus, in this case, the CPU 71 waits until the vehicle tilt angle becomes within the preset value (S34: No).

On the other hand, if it is determined in S34 that the vehicle tilt angle is within the preset value (S34: Yes), it means that the vehicle 1 is traveling on a flat road, and the vehicle is in a horizontal state (or the tilt angle of the road surface on which the vehicle is traveling is small enough that this road can be regarded as a flat road). Since an average current can be accurately measured in this state, the process proceeds to S35.

In S35, a current value is measured, and the measured current value is stored (S35). Then, it is determined if a predetermined amount of time (1 second in the present embodiment) has passed since the start of timing in S31 or not (S36). Note that the measured current value is stored in the average current value memory 73*a* (see FIG. 4).

Note that an example of the "state where there is no change in travel resistance" in claim 4 is the case where the determination result is Yes in all or at least one of S32, S33, and S34.

Thus, the processes in S32 through S34 are performed, and an average current value is measured when the determination results of these steps are Yes (that is, in the state where there is no change in travel resistance) (S37). By this method, it can be accurately determined if the travel resistance has changed by adjustment of the alignment, or by acceleration/deceleration of the vehicle, the operation of the steering wheel, a change in gradient of the path on which the vehicle is traveling, and the like. As a result, the alignment can be efficiently adjusted, and the fuel saving performance can further be improved.

If it is determined in S36 that the predetermined amount of time has not passed yet (S36: No), it means that there is still time until a current value is measured. Thus, in order to secure the number of measured current values, the process proceeds to S32, and the steps described above (S32 to S35) are sequentially performed.

On the other hand, if it is determined in S36 that the predetermined amount of time has passed (S36: Yes), it means that the number of measured current values has been secured. Thus, the average current value is calculated based on the plurality of measured current values (S37), and the average current value calculated in the present process is compared with the average current value calculated in the previous process (S38), and the average current calculation process (S12) is terminated.

Referring back to FIG. 6A, after the alignment of the front wheels 2FL, 2FR is adjusted (S11), the average current value after the adjustment is calculated, and a change in average current value is verified (S12). Then, it is determined if the average current value has decreased or not (S13).

If it is not determined in S13 that the average current value has not decreased (S13: No), it means that the travel resistance of the vehicle 1 has not decreased, that is, the alignment of the front wheels 2FL, 2FR is adjusted in an opposite direction. Thus, a predetermined camber angle in the toe-out direction is applied to the left and right front wheels 2FL, 2FR so that the alignment of the front wheels 2FL, 2FR is adjusted in the direction opposite to that in S11 (S14). Then, the average current calculation process (S12) is executed, and the process proceeds to S15 to see if the travel resistance of the vehicle 1 has decreased or not.

Note that, as described above, applying the camber angle in the toe-out direction corresponds to applying the camber angle in the positive direction (a positive camber) to the wheels 2 to apply the toe angle in the toe-out direction to the wheels 2. In the present embodiment, the predetermined angle is 0.1°. This angle is measured by the extension/retraction sensor apparatus 30, as described above.

If it is determined in S15 that the average current value has decreased (S15: Yes), it means that the travel resistance of the vehicle 1 can be decreased by the adjustment of the alignment of the front wheels 2FL, 2FR in S14. In this case (S15: Yes), the process returns to S14, and S14, S12, and S15 are repeated to see if the travel resistance of the vehicle 1 can further be reduced by adjusting the alignment in this direction or not.

On the other hand, if it is not determined in S15 that the average current value has not decreased (S15: No), it means that the average current has been increased by applying the predetermined camber angle in the toe-out direction to the left and right front wheels 2FL, 2FR in S14.

In this case (S15: No), a predetermined camber angle in the toe-in direction is applied to the left and right front wheels 2FL, 2FR so that the alignment of the front wheels 2FL, 2FR is adjusted in the direction opposite to that in S14 (S16). Then, adjustment of the alignment of the front wheels 2FL, 2FR is terminated, and the process proceeds to S21 to adjust the alignment of the rear wheels 2RL, 2RR.

The adjustment of the alignment by the process in S14 (by the process in the last S14 if S14 has been performed a plurality of times) can be cancelled by the process in S16 to minimize the travel resistance of the vehicle 1. Thus, proper alignment of the front wheels 2FL, 2FR can be achieved, and the fuel consumption performance of the vehicle 1 can be improved.

On the other hand, if it is determined in S13 that the average current has decreased (S13: Yes), it means that the travel resistance of the vehicle 1 can be reduced by the adjustment of the alignment of the front wheels 2FL, 2FR in S11.

In this case (S13: Yes), the process proceeds to S17 to see if the travel resistance of the vehicle 1 can further be reduced by adjusting the alignment in this direction. Thus, the alignment is adjusted again in the same direction as that in S11 (that is, a predetermined camber angle in the toe-in direction is applied to the left and right front wheels 2FL, 2FR) (S17). Then, the average current calculation process (S12) is executed, and the process proceeds to S18 to see if the travel resistance of the vehicle 1 has decreased or not.

If it is determined in S18 that the average current value has decreased (S18: Yes), it means that the travel resistance of the vehicle 1 can be decreased by the adjustment of the alignment of the front wheels 2FL, 2FR in S17. In this case (S18: Yes), the process returns to S17, and S17, S12, and S18 are repeated to see if the travel resistance of the vehicle 1 can further be decreased by adjusting the alignment in this direction.

On the other hand, if it is not determined in S18 that the average current has decreased (S18: No), it means that the average current has been increased by applying the predetermined camber angle in the toe-in direction to the left and right front wheels 2FL, 2FR in S17.

In this case (S18: No), a predetermined camber angle in the toe-out direction is applied to the left and right front wheels 2FL, 2FR so that the alignment of the front wheels 2FL, 2FR is adjusted in the direction opposite to that in S17 (S19). Then, adjustment of the alignment of the front wheels 2FL, 2FR is terminated, and the process proceeds to S21 to adjust the alignment of the rear wheels 2RL, 2RR.

The adjustment of the alignment by the process in S17 (the process in the last S17 if S17 has been performed a plurality of times) can be cancelled by the process in S19 to minimize the travel resistance of the vehicle 1. Thus, proper alignment of the front wheels 2FL, 2FR can be achieved, and the fuel consumption performance of the vehicle 1 can be improved.

The alignment of the rear wheels 2RL, 2RR is adjusted after the adjustment of the alignment of the front wheels 2FL, 2FR is completed. That is, the CPU 71 first applies a predetermined camber angle in the toe-in direction to the left and right rear wheels 2RL, 2RR (S21) to adjust the alignment of the left and right rear wheels 2RL, 2RR.

Note that, as described above with respect to the front wheels 2FL, 2FR, applying the camber angle in the toe-in direction corresponds to applying the camber angle in the negative direction (the negative camber) to the wheels 2 to apply the toe angle in the toe-in direction to the wheels 2 (see FIG. 3). In the present embodiment, the predetermined angle is 0.1°. This angle is measured by the extension/retraction sensor apparatus 30, as described above.

After the camber angle and the toe angle are applied to the wheels 2 to adjust the alignment of the wheels 2 in S21, the average current calculation process (S12) is executed, and it is determined if the average current value has decreased or not (S22), in order to see how the travel resistance of the vehicle 1 has changed by the adjustment of the alignment.

If it is not determined in S22 that the average current value has decreased (S22: No), it means that the travel resistance of the vehicle 1 has not decreased, that is, the alignment of the rear wheels 2RL, 2RR is adjusted in an opposite direction. Thus, a predetermined camber angle in the toe-out direction is applied to the left and right rear wheels 2RL, 2RR so that the alignment of the rear wheels 2RL, 2RR is adjusted in the direction opposite to that in S21 (S23). Then, the average current calculation process (S12) is executed, and the process proceeds to S24 to see if the travel resistance of the vehicle 1 has decreased or not.

Note that, as described above with respect to the front wheels 2FL, 2FR, applying the camber angle in the toe-out direction corresponds to applying the camber angle in the positive direction (the positive camber) to the wheels 2 to apply the toe angle in the toe-out direction to the wheels 2. In the present embodiment, the predetermined angle is 0.1°. This angle is measured by the extension/retraction sensor apparatus 30, as described above.

If it is determined in S24 that the average current value has decreased (S24: Yes), it means that the travel resistance of the vehicle 1 can be decreased by the adjustment of the alignment of the rear wheels 2RL, 2RR in S23. In this case (S24: Yes), the process returns to S23, and S23, S12, and S24 are repeated to see if the travel resistance of the vehicle 1 can further be reduced by adjusting the alignment in this direction or not.

On the other hand, if it is not determined in S24 that the average current value has not decreased (S24: No), it means that the average current has been increased by applying the predetermined camber angle in the toe-out direction to the left and right rear wheels 2RL, 2RR in S24.

In this case (S24: No), a predetermined camber angle in the toe-in direction is applied to the left and right rear wheels 2RL, 2RR so that the alignment of the rear wheels 2RL, 2RR is adjusted in the direction opposite to that in S23 (S25). Then, adjustment of the alignment of the rear wheels 2RL, 2RR is terminated, and the optimal angle adjustment process (S3) is terminated.

The adjustment of the alignment by the process in S23 (the process in the last S23 if S23 has been performed a plurality of times) can be cancelled by the process in S25 to minimize the travel resistance of the vehicle 1. Thus, proper alignment of the rear wheels 2RL, 2RR can be achieved, and the fuel consumption performance of the vehicle 1 can be improved.

On the other hand, if it is determined in S22 that the average current has decreased (S22: Yes), it means that the travel resistance of the vehicle 1 can be reduced by the adjustment of the alignment of the rear wheels 2RL, 2RR in S21.

In this case (S22: Yes), the process proceeds to S26 to see if the travel resistance of the vehicle 1 can further be reduced by adjusting the alignment in this direction. Thus, the alignment is adjusted again in the same direction as that in S21 (that is, a predetermined camber angle in the toe-in direction is applied to the left and right rear wheels 2RL, 2RR) (S26). Then, the average current calculation process (S12) is executed, and the process proceeds to S27 to see if the travel resistance of the vehicle 1 has decreased or not.

If it is determined in S27 that the average current value has decreased (S27: Yes), it means that the travel resistance of the vehicle 1 can be decreased by the adjustment of the alignment of the rear wheels 2RL, 2RR in S26. In this case (S27: Yes), the process returns to S26, and S26, 812, and S27 are repeated to see if the travel resistance of the vehicle 1 can further be decreased by adjusting the alignment in this direction.

On the other hand, if it is not determined in S27 that the average current has decreased (S27: No), it means that the average current has been increased by applying the predetermined camber angle in the toe-in direction to the left and right rear wheels 2RL, 2RR in S26.

In this case (S27: No), a predetermined camber angle in the toe-out direction is applied to the left and right rear wheels 2RL, 2RR so that the alignment of the rear wheels 2RL, 2RR is adjusted in the direction opposite to that in S26 (S28). Then, adjustment of the alignment of the rear wheels 2RL, 2RR is terminated, and the optimal angle adjustment process (S3) is terminated.

The adjustment of the alignment by the process in S26 (the process in the last S26 if S26 has been performed a plurality of times) can be cancelled by the process in S28 to minimize the travel resistance of the vehicle 1. Thus, proper alignment of the rear wheels 2RL, 2RR can be achieved, and the fuel consumption performance of the vehicle 1 can be improved.

Figure 8B:
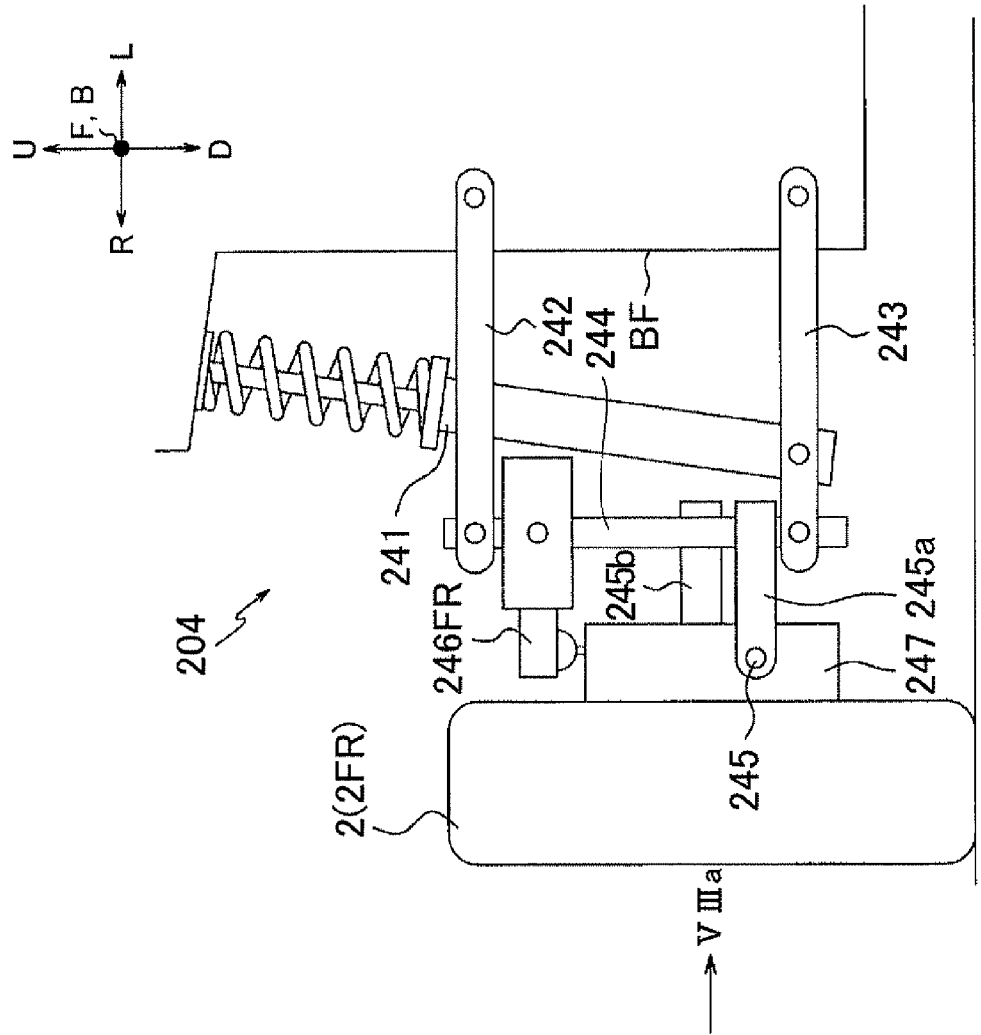
FIG. 8B is a front view of the wheel.
Figure 8A:
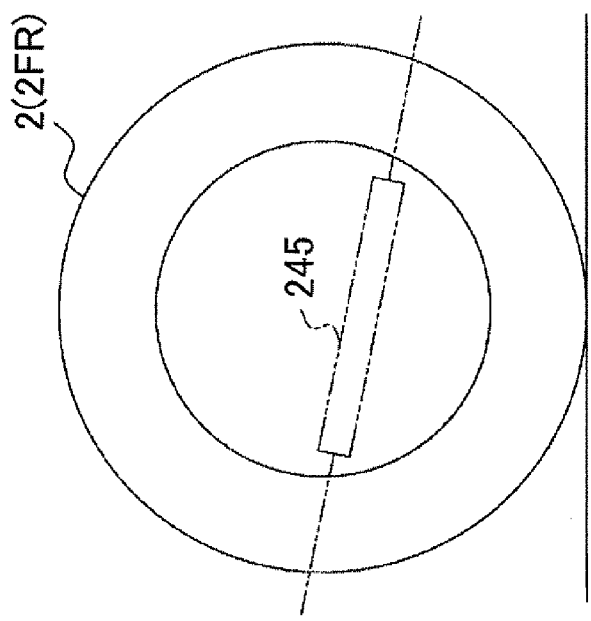
FIG. 8A is a side view of a wheel.

A second embodiment will be described below with reference to FIG. 8. FIG. 8A is a side view of a wheel 2, and FIG. 8B is a front view of a suspension apparatus 204. Note that FIG. 8A corresponds to a side view of the wheel 2 as viewed in the direction shown by arrow VIIIa in FIG. 8B. Note that arrows U-D, L-R, and F-B in FIG. 8 indicate the vertical, lateral, and longitudinal directions of a vehicle 1, respectively.

A total of four suspension apparatuses 204 are respectively provided for the wheels 2, and these suspension apparatuses 204 have the same structure. Thus, the suspension apparatus 204 corresponding to the right front wheel 2FR is shown in FIG. 8B as a representative example. It should be noted that a drive shaft 31, a tie rod 54, and the like are not shown in FIG. 8B in order to simplify the drawing and to facilitate understanding.

Although the first embodiment has been described with respect to the case where each suspension apparatus 4 is a strut suspension, each suspension apparatus 204 of the second embodiment is a double wishbone suspension. Note that the same parts as those of the first embodiment are denoted by the same reference characters, and description thereof will be omitted.

As shown in FIG. 8B, the suspension apparatus 204 of the second embodiment mainly includes a shock absorber 241, an upper arm 242 and a lower arm 243, a link arm 244, first and second coupling arms 245a, 245b, a camber shaft 245, an FR actuator 246FR, and an axle carrier 247.

The shock absorber 241 is structured as a so-called damper apparatus, and functions also as a support. As shown in FIG. 8B, an upper end (the upper side in FIG. 8B) of the shock absorber 241 is coupled to a vehicle body frame BF, while a lower end thereof (the lower side in FIG. 2B) is coupled to the vehicle body frame BF via the lower arm 243.

As shown in FIG. 8B, respective one ends (the right side in FIG. 8B) of the upper arm 242 and the lower arm 243 are rotatably shaft-supported by the vehicle body frame BF, and the other ends thereof (the left side in FIG. 8B) are rotatably shaft-supported by the link arm 244 via rubber bushes (not shown), respectively. Note that, as described above, the lower end of the shock absorber 41 is coupled to the lower arm 243.

As shown in FIG. 8B, the link arm 244 has the first coupling arm 245a and the second coupling arm 245b. The first coupling arm 245a and the second coupling arm 245b are members for coupling the axle carrier 247 with the link arm 244. Respective one ends (the right side in FIG. 8B) of the first coupling arm 245a and the second coupling arm 245b are fixed to the lower end side of the link arm 244, and the other ends thereof (the left side in FIG. 8B) are rotatably shaft-supported by the axle carrier 247 via the camber shaft 245.

The axle carrier 247 is a member for rotatably shaft-supporting the wheel 2. As shown in FIG. 8B, the axle carrier 247 is coupled with the link arm 244 via the first and second coupling arms 245a, 245b and the FR actuator 246FR.

The FR actuator 246FR is a drive apparatus coupling the link arm 244 and the axle carrier 247 with each other, and adjusting the gap between these members 244, 247, and is structured as a hydraulic cylinder. As shown in FIG. 8B, a main body portion (the right side in FIG. 8B) of the FR actuator 246FR is rotatably shaft-supported by the link arm 244, and a rod portion (the left side in FIG. 8B) of the FR actuator 246FR is pivotally coupled with the axle carrier 247 via a ball joint.

As shown in FIG. 8B, the camber shaft 245 is a shaft member for rotatably shaft-supporting the axle carrier 247 by the first coupling arm 245*a* and the second coupling arm 245*b*. When the FR actuator 246FR described above is driven to extend or retract, the wheel 2 is driven to be steered about the camber shaft 245.

As in the first embodiment, in the state where the wheel 2 is not steered, the camber shaft 245 is positioned along the longitudinal direction of the vehicle 1 (the direction shown by arrow F-B) as viewed in the vertical direction of the vehicle 1 (the direction shown by arrow U-D; see FIG. 1), and as shown in FIG. 8A, is tilted in the downward direction of the vehicle 1 (the direction shown by arrow D) (is tilted downward) from the rear side to the front side of the vehicle 1 (from left to right in FIG. 8A) as viewed from the lateral direction of the vehicle 1 (as viewed from the direction shown by arrow L-R).

Thus, when the FR actuator 246FR is driven to extend or retract, the wheel 2 is driven to be steered (is driven to swing) about the camber shaft 245. As a result, a predetermined camber angle and a predetermined toe angle are applied to the wheel 2 (see FIGS. 3D through 3F).

That is, in the present embodiment, the tow angle in the tow-in direction can be applied to the wheel 2 (see FIG. 3F) by applying the camber angle in the negative direction (the negative camber) to the wheel 2, whereas the toe angle in the tow-out direction can be applied to the wheel 2 by applying the camber angle in the positive direction (the positive camber) to the wheel 2, as in the case of the first embodiment described above.

The "alignment control means" in claim 1 corresponds to the processes in S11, S14, S16, S17, S19, S21, S23, S25, S26, and S28 in the flowcharts of FIGS. 6A and 6B (the optimal angle adjustment apparatus). The "travel resistance detecting means" in claim 1 corresponds to the processes in S35 and S37, and the "state determining means" in claim 4 corresponds to the processes in S32, S33, and S34 in the flowchart of FIG. 7 (the average current calculation process).

Although the present invention is described above based on the embodiments, it can be easily inferred that the present invention is not limited to those embodiments, and various improvements and modifications can be made without departing from the spirit and scope of the present invention.

For example, it is to be understood that the numerical values shown in the above embodiments are by way of example only, and other numerical values can be used.

The above embodiments have been described with respect to the case where the wheel drive apparatus 3 for rotation driving the wheels 2 is formed by the electric motor 3*a*. However, it is to be understood that the driving source of the wheels 2 is not necessarily limited to this, and other driving sources may be used. Examples of other driving sources include a reciprocating engine, a diesel engine, a rotary engine, a hybrid engine, and a hydraulic motor.

In the case where the driving source of the wheels 2 is any of the engines, the "driving state of the rotation drive apparatus" in claim 2 corresponds to the amount of fuel that is supplied to the engine. In the case where the driving source of the wheels 2 is a hydraulic motor, the "driving state of the rotation drive apparatus" in claim 2 corresponds to a hydraulic force that is supplied to the motor.

For example, in the case where the driving source of the wheels 2 is any of the engines, the current value in S35, S37, and S38 in the flowchart of FIG. 7 (the average current calculation process) can be replaced with the amount of fuel that is supplied to the engine, and the current value in S13, S15, S18, S22, S24, and S27 in the flowcharts of FIGS. 6A and 6B (the optimal angle adjustment process) can be replaced with the amount of fuel that is supplied to the engine.

The above embodiments have been described with respect to the case where the left and right front wheels 2FL, 2FR are driving wheels, and the left and right rear wheels 2RL, 2RR are driven wheels. However, it is to be understood that the present invention is not necessarily limited to this arrangement, and the arrangement opposite to this can be used.

The above embodiments have been described with respect to the case where the optimal angle adjustment process (S3) is executed during the autocruise. However, it is to be understood that the present invention is not necessarily limited to this, and the optimal angle adjustment process can be performed regardless of whether the autocruise is being activated or not. In this case, the position of the vehicle may be obtained by a car navigation system using a global positioning system (GPS), and whether the optimal angle adjustment process should be executed or not may be determined based on the obtained position of the vehicle, and map data (e.g., data showing if the road is straight or not).

The above embodiments have been described with respect to the case where the toe angle of each wheel 2 is changed by the tilted camber shaft 45, 245. However, the present invention is not necessarily limited to this structure, and the present invention may use a four-wheel toe-angle independent variable mechanism for varying the toe angle of each wheel 2 independently. An example of the four-wheel toe-angle independent variable mechanism is a mechanism in which the wheels 2 and the vehicle body frame BF are connected by three retractable actuators, and the tilt of each wheel 2 with respect to the vehicle body frame BF is changed by adjusting the respective extension/retraction amounts of the three retractable actuators, whereby the toe angle of each wheel 2 is changed.

The invention claimed is:

1. A control apparatus for use in a vehicle that includes a wheel, and an alignment adjustment apparatus for adjusting alignment of the wheel, comprising:
   travel resistance detecting means for detecting a travel resistance of the vehicle; and
   alignment control means for controlling the alignment adjustment apparatus so as to reduce the travel resistance that is detected by the travel resistance detecting means; and
   wherein the alignment adjustment apparatus of the vehicle includes:
      a camber shaft that serves as a central axis about which the wheel is pivoted when changing a camber angle of the wheel, and that is tilted downward or upward along a longitudinal direction of the vehicle, and
      a steering drive apparatus for driving the wheel so as to pivot the wheel about the camber shaft;
   wherein, when the wheel is pivoted in one direction about the camber shaft by the steering drive apparatus, the camber angle and toe angle of the wheel are both simultaneously changed by the same pivoting movement in the one direction about the camber shaft; and
   wherein the alignment control means controls the steering drive apparatus.

2. The control apparatus according to claim 1, wherein:
   the vehicle includes a rotary drive unit for rotatably driving the wheel, and
   the travel resistance detecting means detects the travel resistance based on a driving state of the rotary drive unit.

3. The control apparatus according to claim 2, wherein the rotation drive apparatus is an electric motor, and the travel resistance detecting means detects the travel resistance based on a current value that is supplied to the rotary drive unit.

4. The control apparatus according to claim 3, further comprising:
state determining means for determining if a state where the vehicle is traveling is a steady state wherein there is no change in the travel resistance, and
detection of the travel resistance of the vehicle by the travel resistance detecting means is performed when it is determined by the state determining means that the vehicle is traveling in the steady state.

5. The control apparatus according to claim 4, wherein:
the vehicle includes left and right wheels, and
the alignment control means controls the alignment adjustment apparatus so as to bring the left and right wheels into a toe-in state or a toe-out state.

6. The control apparatus according to claim 4, wherein:
the vehicle includes left and right front wheels, and left and right rear wheels, and
the travel resistance detecting means includes:
first detecting means for detecting the travel resistance of the vehicle when only alignment of one of the left and right front wheels and the left and right rear wheels has been adjusted, and
second detecting means for detecting the travel resistance of the vehicle when only alignment of the other of the left and right front wheels or the other of the left and right rear wheels has been adjusted.

7. The control apparatus according to claim 3, wherein:
the vehicle includes left and right wheels, and
the alignment control means controls the alignment adjustment apparatus so as to bring the left and right wheels into a toe-in state or a toe-out state.

8. The control apparatus according to claim 3, wherein:
the vehicle includes left and right front wheels, and left and right rear wheels, and the travel resistance detecting means includes:
first detecting means for detecting the travel resistance of the vehicle when only alignment of one of the left and right front wheels and the left and right rear wheels has been adjusted, and
second detecting means for detecting the travel resistance of the vehicle when only alignment of the other of the left and right front wheels or the other of the left and right rear wheels has been adjusted.

9. The control apparatus according to claim 2, wherein:
the vehicle includes left and right wheels, and
the alignment control means controls the alignment adjustment apparatus so as to bring the left and right wheels into a toe-in state or a toe-out state.

10. The control apparatus according to claim 2, wherein:
the vehicle includes left and right front wheels, and left and right rear wheels, and
the travel resistance detecting means includes:
first detecting means for detecting the travel resistance of the vehicle when only alignment of one of the left and right front wheels and the left and right rear wheels has been adjusted, and
second detecting means for detecting the travel resistance of the vehicle when only alignment of the other of the left and right front wheels or the other of the left and right rear wheels has been adjusted.

11. The control apparatus according to claim 2, further comprising:
state determining means for determining if a state where the vehicle is traveling is a steady state wherein there is no change in the travel resistance, and
detection of the travel resistance of the vehicle by the travel resistance detecting means is performed when it is determined by the state determining means that the vehicle is traveling in the steady state.

12. The control apparatus according to claim 1 wherein:
the vehicle includes left and right wheels, and
the alignment control means controls the alignment adjustment apparatus so as to bring the left and right wheels into a toe-in state or a toe-out state.

13. The control apparatus according to claim 12, wherein:
the vehicle includes left and right front wheels, and left and right rear wheels, and
the travel resistance detecting means includes:
first detecting means for detecting the travel resistance of the vehicle when only alignment of one of the left and right front wheels and the left and right rear wheels has been adjusted, and
second detecting means for detecting the travel resistance of the vehicle when only alignment of the other of the left and right front wheels or the other of the left and right rear wheels has been adjusted.

14. The control apparatus according to claim 1, wherein:
the vehicle includes left and right front wheels, and left and right rear wheels, and
the travel resistance detecting means includes:
first detecting means for detecting the travel resistance of the vehicle when only alignment of one of the left and right front wheels and the left and right rear wheels has been adjusted, and
second detecting means for detecting the travel resistance of the vehicle when only alignment of the other of the left and right front wheels or the other of the left and right rear wheels has been adjusted.

* * * * *